Figure 1:
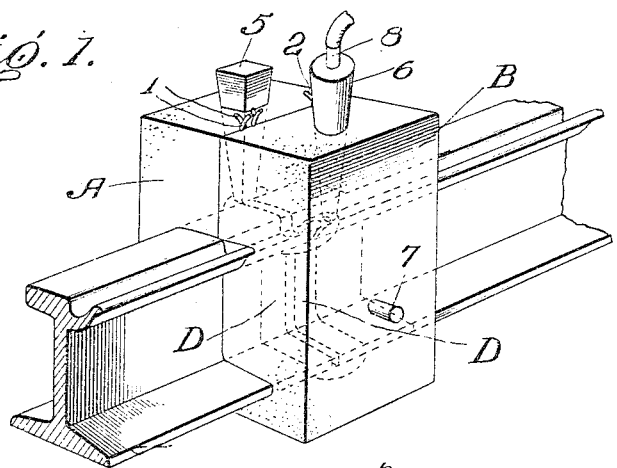

J. H. DEPPELER.
METHOD OF SEALING OR LUTING MOLDS.
APPLICATION FILED SEPT. 8, 1915.

1,168,062.

Patented Jan. 11, 1916.

Inventor

By

Attorney

UNITED STATES PATENT OFFICE.

JOHN H. DEPPELER, OF JERSEY CITY, NEW JERSEY, ASSIGNOR TO GOLDSCHMIDT THERMIT COMPANY, OF NEW YORK, N. Y., A CORPORATION OF NEW YORK.

METHOD OF SEALING OR LUTING MOLDS.

1,168,062.  Specification of Letters Patent.  Patented Jan. 11, 1916.

Application filed September 8, 1915. Serial No. 49,470.

*To all whom it may concern:*

Be it known that I, JOHN H. DEPPELER, citizen of the United States, and resident of Jersey City, in the county of Hudson and State of New Jersey, have invented a certain new and useful Method of Sealing or Luting Molds, of which the following is a specification.

This invention relates to the method of sealing or luting molds, and has for its object to provide an improved method which, in its preferred form, consists in closing the leakage openings of the mold with one or more strips of suitable material which has been previously treated with a sticky substance, and then blowing or otherwise forcing finely divided material into the mold, which, in tending to escape through the leakage openings, is caught by the sticky substance on the luting material and thereby completely seals any minor leakage openings not completely sealed by the luting strip.

The luting strips are preferably of refractory material, such as asbestos, and the sticky substance above referred to is preferably molasses, the asbestos strips being moistened or coated with the molasses before they are positioned. The luting strips so treated may be applied to the article to which the mold sections are clamped to prevent leakage between the surfaces of the mold and the adjacent surfaces of the article, or they may be positioned between the meeting surfaces of the mold sections themselves. When leakage openings occur between the surfaces of the mold sections and the articles to which the mold sections are applied and also between the meeting surfaces of the mold sections themselves, the luting strips are preferably so applied as to close both sets of leakage openings.

The method is especially valuable in the butt-welding of articles, such as the ends of railway rails. One method of welding the ends of railway rails and the like is to apply a mold to the ends of the railway rails and to pour into the mold an aluminothermic mixture, the heat of which is sufficient to weld the adjacent ends of the rails together. It is apparent that such a mold must fit the contour of the article, such as the rail section, exactly or the fluid metal poured into the mold will leak out. On account of ordinary variations in the molds themselves, or in the contour of the articles to which the molds are applied, it is almost impossible to make the molds fit the articles snugly enough to prevent the fluid metal from leaking out.

It has been the common practice in the welding of railway rails and also in foundry work to seal the joints between the molds and the articles to be welded by means of clay, but this must be done with extreme care and the clay or similar material must be forced into the leakage opening itself and must be uniform and continuous for the entire length of the leakage opening, or the fluid metal will leak out. As it is customary to preheat the mold before the molten metal is poured into the same, the sealing clay has a tendency to crack, due to the fact that it is dried by the heat and, therefore, the metal in the mold will be liberated. Furthermore, the operator has no means of ascertaining whether or not the sealing has been properly done. The present method of luting or sealing the molds by means of clay or similar material allows considerable space for the fluid metal to run out before striking the luting, and thus allows the formation of a fin or thin sheet of metal adjacent the molded portion, which, of course, is wasteful and unsightly.

The present improved method overcomes all of the above-noted objections, as the luting strips may be quickly applied and may be positioned near enough to the interior compartment of the mold to prevent the formation of the above-mentioned fin. As the sections of the mold intended for use in welding railway rails and similar articles bear against each other for a width of one inch or more all around the bottom and sides of the mold, the luting strips would have to be forced between the sections of the mold for a distance of one inch or more before the fluid metal could escape from the mold. When the finely divided fire-clay or other similar material is blown into the mold, and if there are any leakage openings not properly sealed by the luting strip, a cloud of dust arising from the mold will indicate to the operator that the leakage openings are not properly sealed. Such leakage openings, however, will be automatically sealed, due to the fact that a number of particles of the fine material, in being forced through the leakage openings, will be caught by the sticky substance on the luting strips and the fine particles so caught will seal all of the relatively small leakage openings which it is not possible to seal by the luting strips themselves. It is obvious that the finely divided material may be forced through the leakage openings in any other manner, for instance, from the outside of the mold inwardly, but preferably all of the openings leading to the interior of the mold, such as the sprue openings and the preheating opening, are first plugged, or otherwise closed to render the interior of the mold substantially air-tight, except for the possible existence of leakages near the luting strips, and then the finely divided material is blown into the interior of the mold under pressure, so that the particles of the finely divided material, while in suspension in the interior of the mold, will tend to escape through any existing leakage openings.

The accompanying drawing illustrates the application of the method in the welding of railway rails, but it will be understood that the invention is not limited to the welding of railway rails, or any other articles, as the improved process will be found valuable for luting mold sections when the same are not applied to already existing articles.

Figure 5:
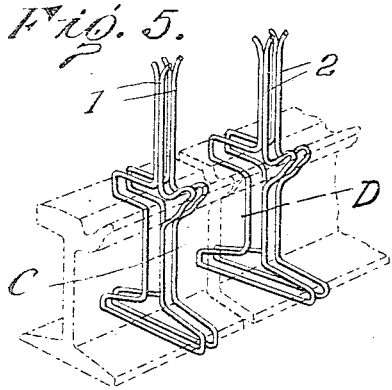
Figure 2:
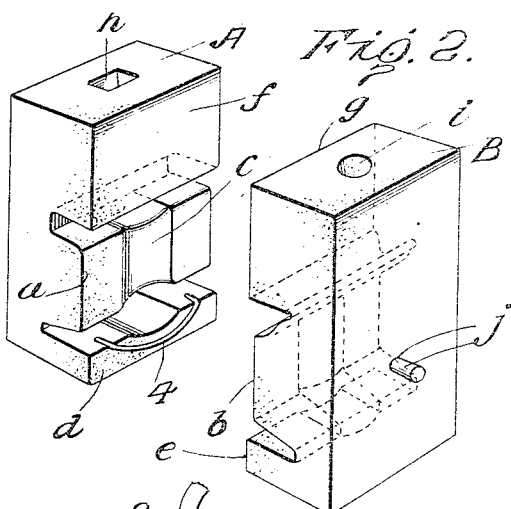
Figure 3:
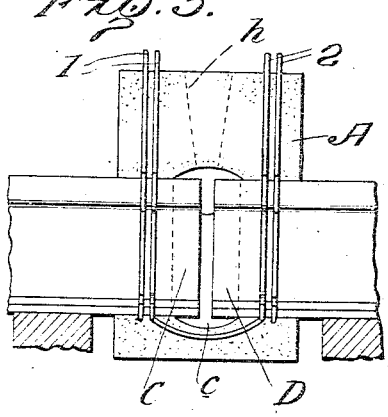
Figure 4:
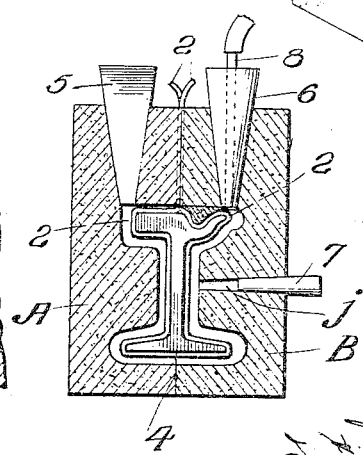

In the drawing:—Figure 1 is a perspective view showing the sections of a mold applied to the ends of two railway rails, the leakage openings being sealed in accordance with the present invention and the sprue and preheating openings being closed preparatory to the introduction of the fire-clay; Fig. 2 is a perspective view showing the two mold sections before they are applied to the rail ends; Fig. 3 is a side elevation showing the rear mold section applied to the rail ends but the front mold section removed to expose the luting strips; Fig. 4 is a transverse sectional view taken through the center of the two mold sections and showing the same applied to the rail ends; and Fig. 5 is a perspective view illustrating the manner of applying the luting strips to the rail ends.

Referring to the drawing, it will be seen that the mold sections, indicated at A and B are provided with transverse irregular-shaped openings $a$ and $b$, respectively, which when the mold sections are brought together, form a transverse opening corresponding in shape to the contour of the rail section. Each mold section is provided with an interior recess $c$, which when the mold sections are applied to the rail ends C and D, encircles the sides and bottom of the rail ends and is capable of forming a sleeve or collar around the ends of the rails when the molten metal is poured into the mold.

Before the mold sections are applied to the rail ends, one or more strips of refractory material, such as asbestos, are treated with molasses and so applied to the rail ends that all of the leakage openings of the mold will be substantially closed by such strips. In the drawing, four strips of asbestos are used, two strips being shown at 1 in Fig. 5 encircling the end of one rail and two strips at 2 encircling the end of the opposite rail. A fifth strip is applied to the bottom part of one-half of the mold as shown at 4 in Fig. 2. The sticky substance with which the strips are treated causes them to adhere to the rail ends and to the mold, and they are, therefore, held in position until the mold sections are applied. When the mold sections are positioned and clamped in place, it is obvious that the luting strips intervening between the surfaces of the rails and the adjacent surfaces of the mold sections will constitute an efficient luting. The short strip 4 will lie between the meeting surfaces of the mold sections at the lower portion thereof, as clearly shown in Fig. 3 to prevent leakage of the molten metal from the bottom of the mold between the meeting surfaces of the mold sections shown at $d$ and $e$, respectively. The free ends of the luting strips pass upwardly between the meeting surfaces of the mold sections, as best shown in Figs. 1, 3 and 4, and thereby prevent leakage between the upper meeting surfaces $f$ and $g$.

Before the fire-clay or other finely divided material is forced into the mold, the sprue openings $h$ and $i$ are closed by means of the plugs 5 and 6, respectively. The preheating opening $j$ may be closed by a plug 7. One of the plugs, such as the plug 6, has associated therewith, a pipe section 8, through which the fire-clay under pressure may be introduced into the mold. When the fire-clay is so introduced, it is obvious that in attempting to escape through any of the leakage openings, some of the same will be caught by the sticky material on the strips, and thereby completely seal such leakage openings. The mold and the rail ends are then preheated in the usual manner through the preheating openings $j$, and all is then in readiness for the welding operation.

It is obvious that the luting strips may be applied in numerous different ways, depending upon the shape of the articles treated, the construction of the mold sections, and further depending upon whether the molding operation takes place upon already existing articles, such as railway rails, or whether the mold sections are employed to produce a complete article. Therefore, the manner of applying the luting strips illustrated in Fig. 5 is merely exemplary. Furthermore, instead of using molasses alone for the sticky substance, some substance may be used which will cause the strips or the substance to expand when the mold is preheated. For instance, a mixture of molasses and flour may be used, in which event the expansion of the strips may be sufficient to thoroughly seal the joints without blowing fire-clay or other material into the mold. Instead of mixing the flour with the molasses, it may be blown into the mold and used in place of the fire-clay.

Various other changes may be made in the details of the process as above described, without departing from the spirit or scope of the invention as defined in the accompanying claims.

What I claim is:

1. The method of luting or sealing molds employed in welding the ends of railway rails and the like, which consists in winding a strip of refractory material around the end of each of the rails before applying the mold.

2. The method of luting or sealing mold sections which consists in treating strips of material with a sticky substance and so positioning the strips thus treated before the mold sections are assembled as to close all of the leakage openings which would normally occur after assembling of the mold sections.

3. The method of luting or sealing the joints between mold sections and the articles to which they are applied, which consists in treating strips of material with a sticky substance and applying the same to the articles before the mold sections are applied.

4. The method of luting or sealing molds, which consists in closing the leakage openings with strips of material treated with a sticky substance, and then blowing finely divided material into the mold, for the purpose described.

5. The method of luting or sealing molds, which consists in closing the leakage openings with strips of material treated with a sticky substance, and then subjecting the leakage openings to a pressure medium containing finely divided material.

6. The method of luting or sealing molds, which consists in closing the leakage openings with strips of material treated with a sticky substance, and then blowing fine fire-clay into the mold, for the purpose described.

7. The method of luting or sealing molds, which consists in closing the leakage openings with strips of material treated with a sticky substance, and then subjecting the leakage openings to a pressure medium containing finely divided fire-clay.

8. The method of luting or sealing molds, which consists in closing the leakage openings with strips of material treated with a sticky substance, closing all of the openings leading to the interior of the mold to render the interior of the mold substantially airtight except for possible leakage openings not completely closed by said strips, and then blowing finely divided material into the interior of the mold, for the purpose described.

9. The method of luting or sealing mold sections which consists in so positioning strips of material before the mold sections are assembled as to close all of the leakage openings which would normally occur after assembling of the mold sections, and treating such strips with a sticky substance and a finely divided material.

10. The method of luting or sealing molds employed in welding the ends of railway rails and the like, which consists in treating strips of refractory material with a sticky substance and then winding a strip of the refractory material thus treated around the end of each of the rails before applying the mold.

Signed at Jersey City in the county of Hudson and State of New Jersey this 26th day of August A. D. 1915.

JOHN H. DEPPELER.

Witnesses:
  Edw. F. Begturf,
  Frank E. Older.